(12) United States Patent
Koyama

(10) Patent No.: US 6,499,556 B1
(45) Date of Patent: Dec. 31, 2002

(54) REVOLVING DECK FOR EARTHMOVING MACHINERY

(75) Inventor: Hitoshi Koyama, Hirakata (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/620,908

(22) Filed: Jul. 20, 2000

(30) Foreign Application Priority Data

Mar. 8, 1999 (JP) ............................................ 11-219648

(51) Int. Cl.⁷ ............................................... B62D 21/00
(52) U.S. Cl. ...................................... 180/311; 280/781
(58) Field of Search .......................... 180/89.11, 89.12, 180/89.13, 327, 311, 312; 280/760, 781

(56) References Cited

U.S. PATENT DOCUMENTS

| | | | |
|---|---|---|---|
| 4,037,894 A | | 7/1977 | Sankey |
| 5,016,721 A | * | 5/1991 | Yamamoto et al. .. 180/89.13 X |
| 5,894,908 A | | 4/1999 | Eftefield |
| 5,931,247 A | * | 8/1999 | Peterson ................. 180/89.12 |
| 6,155,632 A | * | 12/2000 | Fujimoto ............. 180/89.13 X |
| 6,170,588 B1 | * | 1/2001 | Irino et al. ................ 180/89.12 |

FOREIGN PATENT DOCUMENTS

| | | | | |
|---|---|---|---|---|
| EP | 0311082 | * | 6/1988 | .............. 180/89.13 |
| JP | 5125743 | * | 5/1993 | .............. 180/89.13 |
| JP | 7018701 | * | 1/1995 | .............. 180/89.13 |
| JP | 7243223 | * | 9/1995 | .............. 180/89.13 |

\* cited by examiner

*Primary Examiner*—Paul N. Dickson
*Assistant Examiner*—Toan C To
(74) *Attorney, Agent, or Firm*—Varndell & Varndell, PLLC

(57) ABSTRACT

A revolving deck for an earthmoving machinery, which is shaped to be kept away from contact with an obstacle due to being within the tail swing radius of the counter weight and which can be made light in weight.

A revolving deck is formed, as seen in the top plan view, to have a swing radius R substantially equal to that of the counter weight, and is made of an integral skeleton structure in which a main frame and side frames are jointed by overhanging beams. The side frames are made to act as revolving frame guards.

3 Claims, 10 Drawing Sheets

REVOLVING DECK FOR EARTHMOVING MACHINERY

BACKGROUND OF THE INVENTION

1. Field of the Invention

The present invention relates to a revolving deck for an earthmoving machinery such as a minimal rear-swing radius hydraulic excavator.

2. Related Art

In the related art, there has been widely employed the so-called "minimal rear-swing radius hydraulic excavator" in which the swinging locus of the rear end portion of a revolving unit having vertically swinging equipment at its front portion is confined, as seen in a top plan view, within the width of left and right crawlers of a travel unit. This minimal rear-swing radius hydraulic excavator 30 will be described with reference to FIGS. 12 and 13. FIG. 12 is a side view of the minimal rear-swing radius hydraulic excavator of the related art, and FIG. 13 is a perspective view showing a revolving deck 33 of FIG. 12.

Over a travel unit 31, as shown in FIG. 12, there is revolvably mounted a revolving unit 32. On the upper face of the revolving deck 33 or the base of the revolving unit 32, there are mounted a cab 34, a machine cab including an engine 35a and a hydraulic unit 35b, a counter weight 36 and so on. To the central front portion of the revolving deck 33, on the other hand, there are swingably attached equipment 40 including a boom 41, an arm 42 and a bucket 43. These components of the equipment 40 are driven by a boom cylinder 44, an arm cylinder 45 and a bucket cylinder 46, respectively.

As shown in FIG. 13, the revolving deck 33 is constructed by forming a frame body 33a of a single circular plate and by welding a center bracket 33b for mounting the boom 41 and the boom cylinder 44 to the central front portion on the frame body 33a, and a rear bracket 33c for mounting the engine 35a and the counterweight 36 to the central rear portion, respectively. On the other hand, the frame body 33a is equipped at its left portion with a bracket 33d for mounting the cab 34 and at its right portion with a bracket 33e for mounting the hydraulic unit 35b and so on. To suitable portions of the frame body 33a, there are additionally welded a variety of brackets and reinforcing members. To the outer periphery of the frame body 33a, moreover, there are attached left and right revolving guards 37 and 38 by means of bolts 39.

If the frame body 33a of the revolving deck 33 is made of the single plate, however, the plate thickness has to be increased to retain the rigidity thereby to invite a problem that the increased weight raises the cost. Since the left and right revolving guards 37 and 38 are attached by the bolts 39, on the other hand, there is the problem that they fail to contribute to the strength of the frame body 33a.

In order to solve these problems, there have been proposed several techniques in the related art.

As a first related art of the revolving deck for the hydraulic excavator, there is a technique of the revolving frame of a hydraulic excavator, as disclosed in Unexamined Published Japanese Utility Model Application No. 87455/1994, for example. FIG. 14 is a perspective view showing the revolving frame of the Utility Model Application. In this Application, a frame body 51, a fender 52, a counter weight 53, an oil tank 54 and so on are integrally cast.

As a second related art, on the other hand, there is a technique of a revolving frame of an earthmoving machinery, as disclosed in Unexamined Published Japanese Patent Application No. 88617/1998, for example. According to this Japanese Patent Application, as shown in FIG. 15, of a left side frame 62 forming part of the structure of a revolving frame 61, a sectional shape of a rear frame portion 62B for supporting a machine room 71 and so on from the lower side is made larger in the vertical (or height) direction than a front frame portion 62A for supporting a cab 72 and so on from the lower side. Of individual overhanging beams 63, 64, 65, 66 and 67 overhanging leftward and rightward from the central portion of the revolving frame 61 to the front frame portion 62A and the rear frame portion 62B, on the other hand, the front side overhanging beam 64 having its leading end side jointed to the rear frame portion 62B is made to have a larger sectional shape.

However, the following problems are left unsolved in the related art described above.

The technique, as disclosed in Unexamined Published Japanese Utility Model Application No. 87455/1994, can have effects of a high rigidity and an improved assemblability for a small-sized machinery, because the frame body 51, the fender 52, the counter weight 53 and the oil tank 54 are integrally cast. For a medium- or large-sized machinery, however, the weight is drastically increased and also strength is required. As a result, difficulty is encountered in its manufacture, and the drive power required for the entire machinery is increased. Thus, problems arise in the fuel consumption, the performance of the machinery and the cost for its manufacture.

In the revolving frame disclosed in Unexamined Published Japanese Patent Application No. 188617/1998, on the other hand, the front portions of the front frame portion 62A and a right side frame 68, as seen in a top plan view, are located outside of the tail swing radius of the counter weight 73 so that they fail to conform with the so-called "minimal rear-swing radius type". As a result, this failure may allow the revolving frame to contact with an obstacle at those overhanging portions.

SUMMARY OF THE INVENTION

In view of the aforementioned problems of the related art, the invention has an object to provide a revolving deck for an earthmoving machinery, which is shaped to have no contact with an obstacle within the tail swing radius of a counter weight and which has a structure of a high rigidity but not a large weight.

In order to achieve the object, according to a first aspect of the invention, there is provided a revolving deck for an earthmoving machinery, comprising: a main frame including a revolving unit mount portion and mounting a counter weight on its rear end portion; side decks arranged on the left and right sides of the main frame; and side frames disposed at the outer ends of the side decks, wherein the swinging locus to be drawn by the rear end portion of the counter weight is confined, as seen in a top plan view, substantially within the swing arc of the revolving deck. The revolving deck is formed, as seen in the top plan view, to be substantially within the width of a crawler, and the side decks are made of an integral skeleton structure including a plurality of overhanging beams jointing the main frame and the side frames.

According to the first aspect of the invention, the revolving deck is formed within the tail swing radius substantially equal to the counter weight so that it does not contact with an obstacle within this radius. Further, the revolving deck is given an integral skeleton structure in which the main frame and the side frames are jointed by a plurality of overhanging beams (or side decks), so that the weight can be made less than that of a single plate structure or a cast structure. On the other hand, even a medium- or large-sized hydraulic excavator can be easily manufactured with this simple structure so that its cost can be lowered. Because of the integral skeleton structure, moreover, many openings can be formed in the lower face of the revolving deck to improve the maintenance from the bottom of the deck.

According to a second aspect of the invention, the side frames of the first aspect are made to act as guards for protecting the overhanging beams and the main frame from an external force.

According to the second aspect, the side frames are made to act as the guards (or revolving frame guards) for protecting the overhanging beams and the main frame from external forces. As a result, these guards can provide reinforcing members for the frames to lighten the weight and reduce the number of parts so that the parts can be easily serviced, lowering the cost.

DESCRIPTION OF THE PREFERRED EMBODIMENTS

The invention will be described in connection with embodiments of a revolving deck of an earthmoving machinery with reference to FIGS. 1 to 11.

Figure 12:
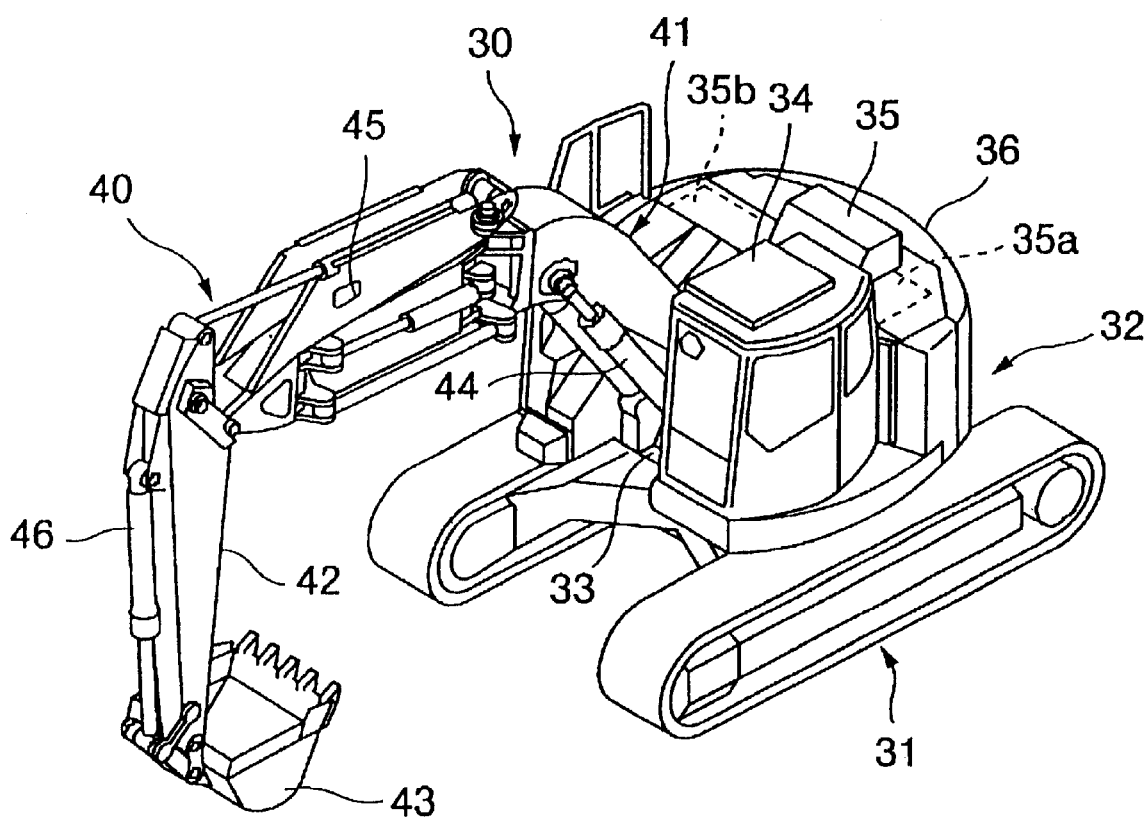
FIG. 12 is a perspective view of a minimal rear-swing radius hydraulic excavator of the related art.
Figure 13:
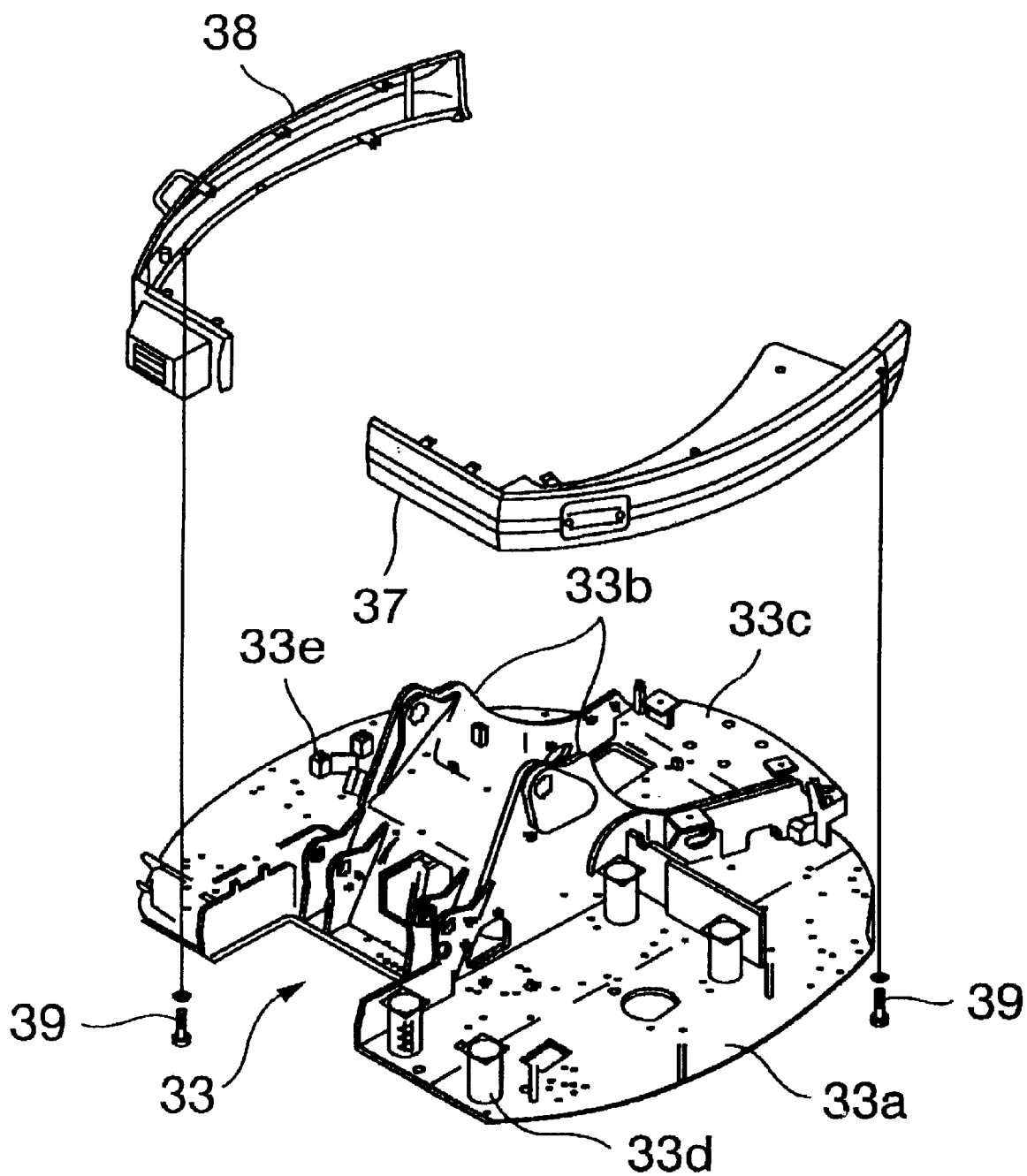
FIG. 13 is a diagram showing a main frame of the same.
Figure 14:
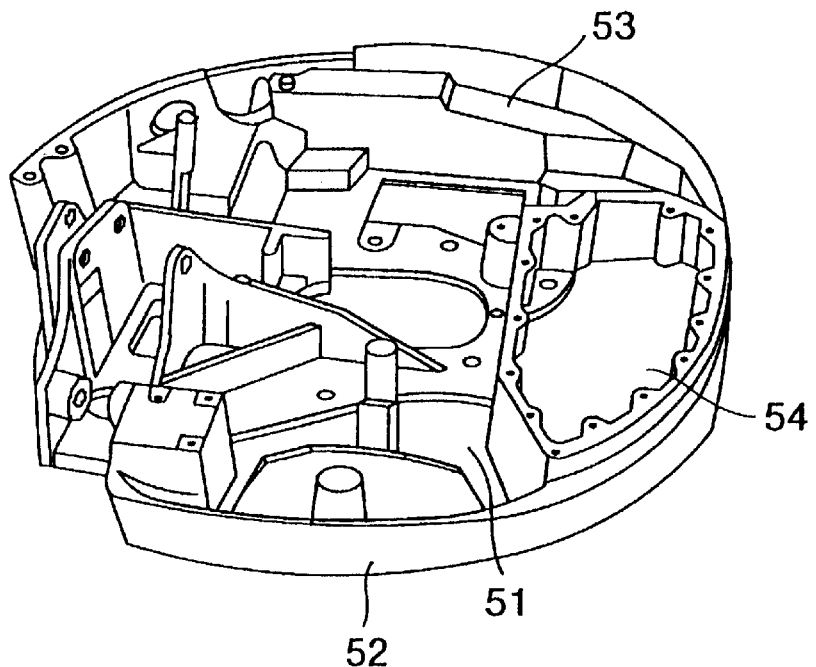
FIG. 14 is a diagram showing an example of a main frame of a minimal rear-swing radius of the related art.
Figure 15:
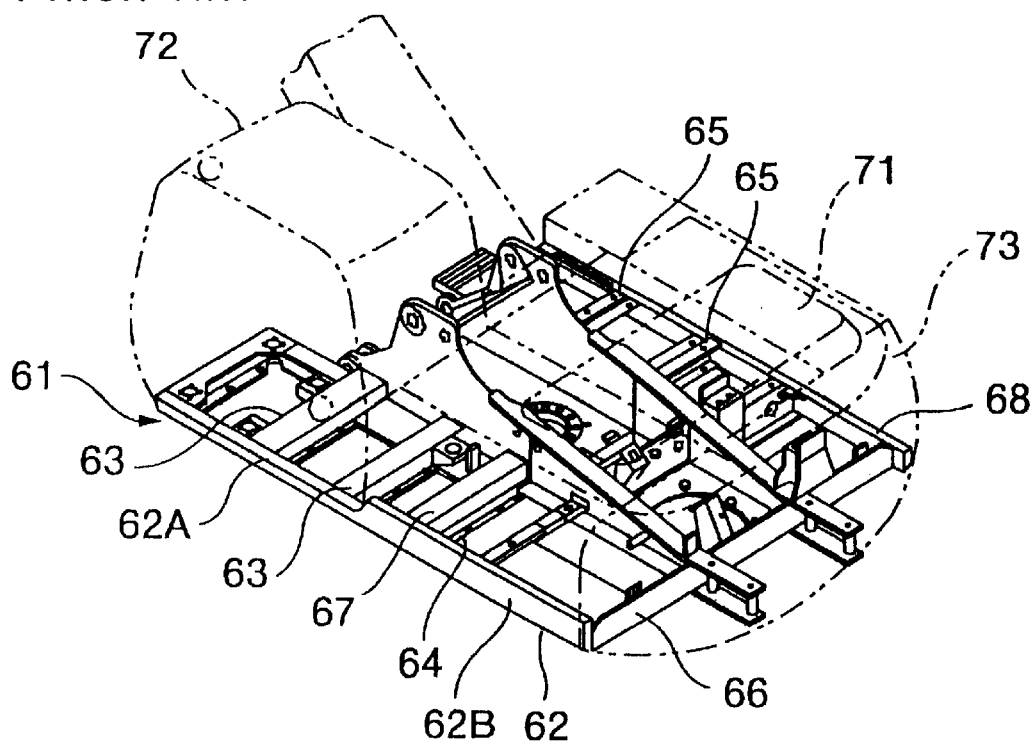
FIG. 15 is a diagram showing an example of the main frame of the hydraulic excavator of the related art.

Here, a minimal rear-swing radius hydraulic excavator, to which a revolving deck according to the invention is applied, adopts a construction basically similar to that of the minimal rear-swing radius hydraulic excavator which has been described with reference to FIG. 12. Here will be omitted descriptions and illustrations of similar functions.

Figure 1:
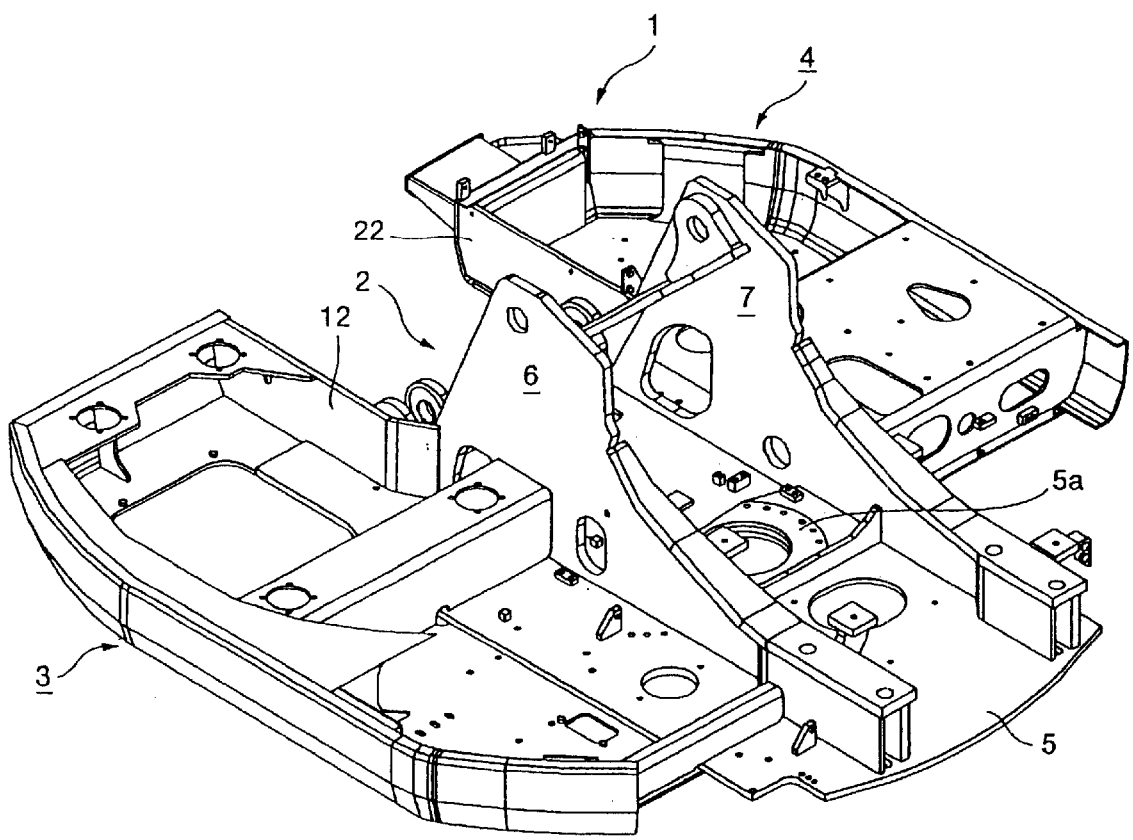
FIG. 1 is a perspective view of a revolving deck of an earthmoving machinery according to the invention.
Figure 2:
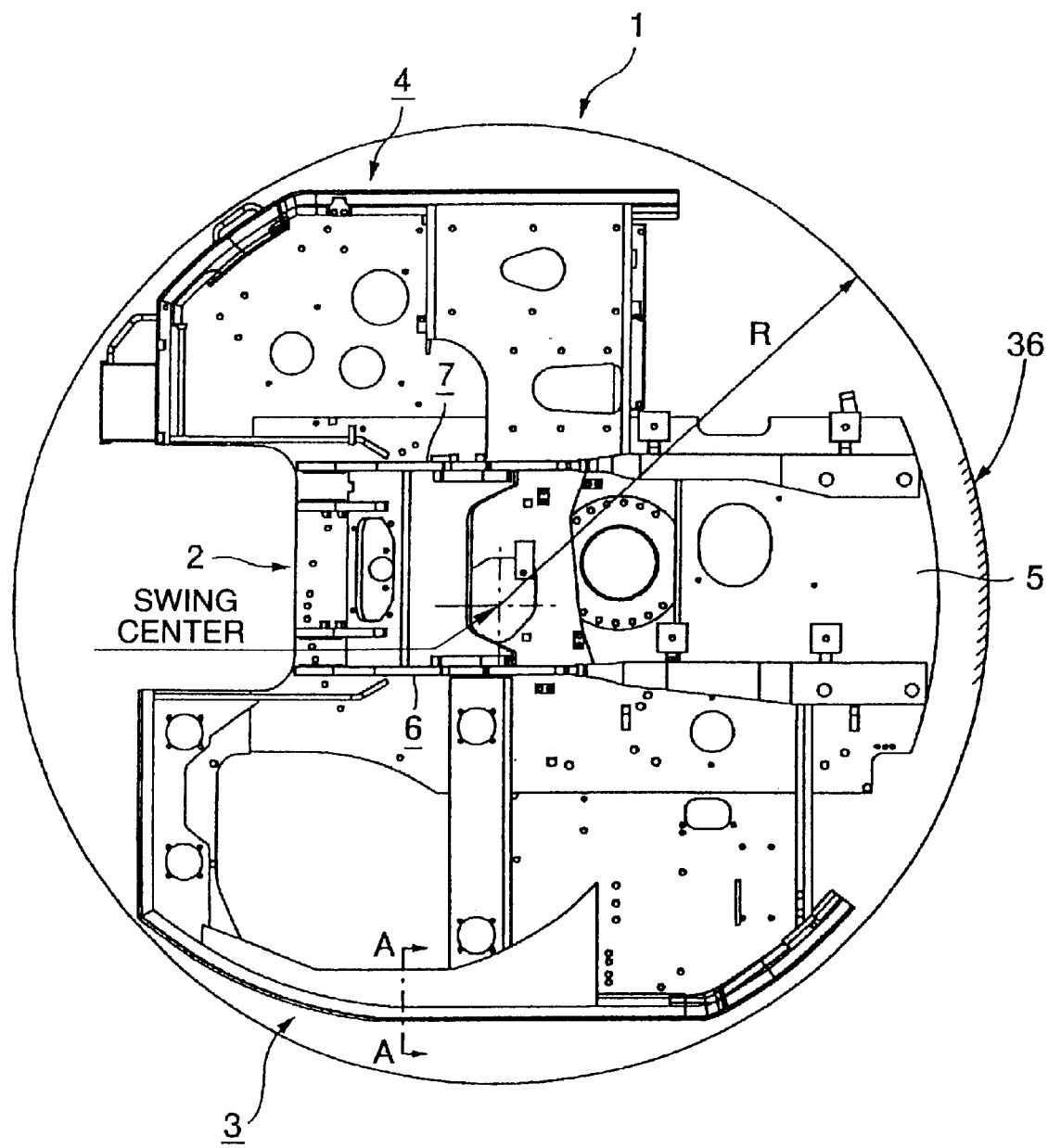
FIG. 2 is a top plan view of a revolving deck of the same.

FIG. 1 is a perspective view of a revolving deck according to the invention, and FIG. 2 is a top plan view of the revolving deck of FIG. 1. In these Figures, the same components as those of FIG. 12 will be described by designating them by the same reference numerals.

In FIGS. 1 and 2, a revolving deck 1 is equipped with a main frame 2 and left and right side decks 3 and 4. The main frame 2 is equipped with a center plate 5 and a pair of left and right center beams 6 and 7 on the left and right sides of the center plate 5 across a revolving unit mounting portion 5a with respect to the longitudinal direction of the implement. To the front of the paired left and right center beams 6 and 7, there are attached a boom 41 and a boom cylinder 44 of the equipment 40. An engine 35a and a counter weight 36 are mounted on and supported by the center rear portion and the rear portion of the equipment 40, respectively. Moreover, a cab 34 is mounted on the left side deck 3, and a hydraulic unit 35b or the like is mounted on the right side deck 4.

Figure 3:
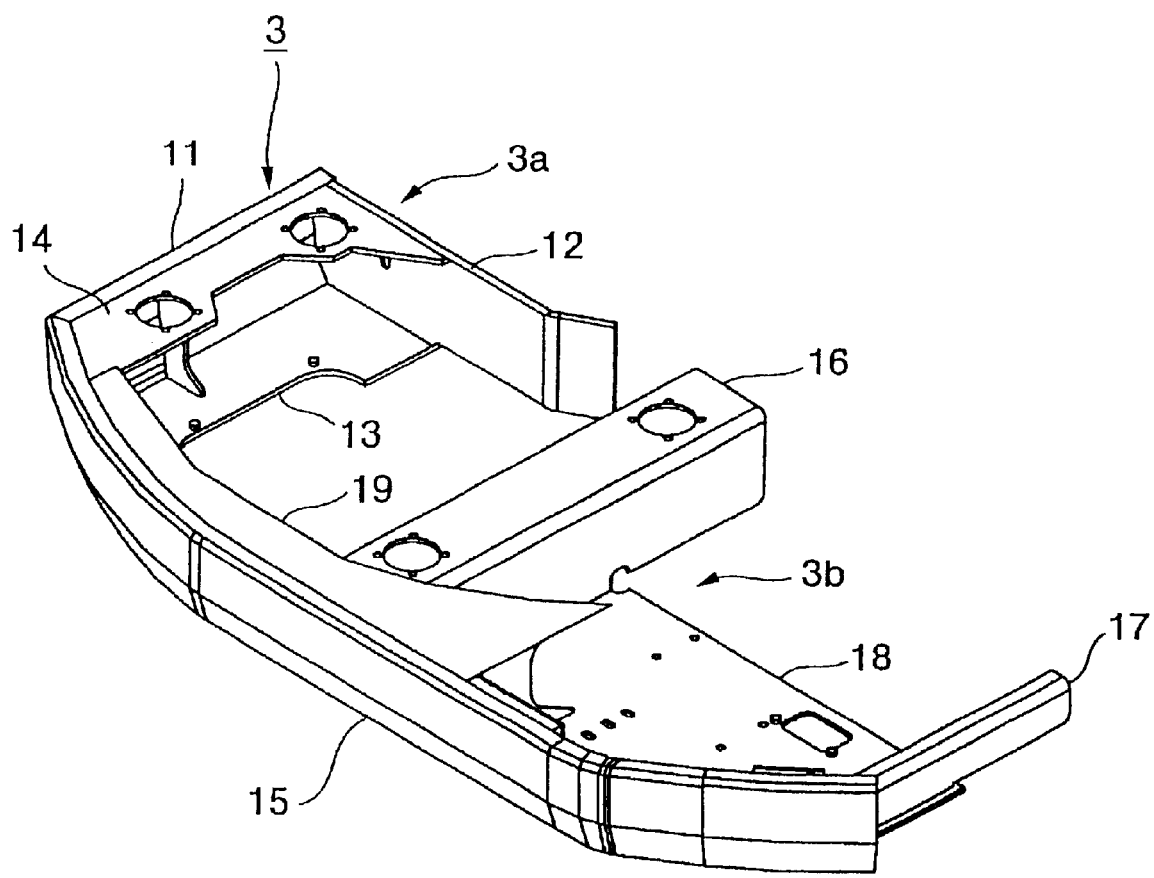
FIG. 3 is a perspective view of a left-hand side deck of the same.
Figure 4:
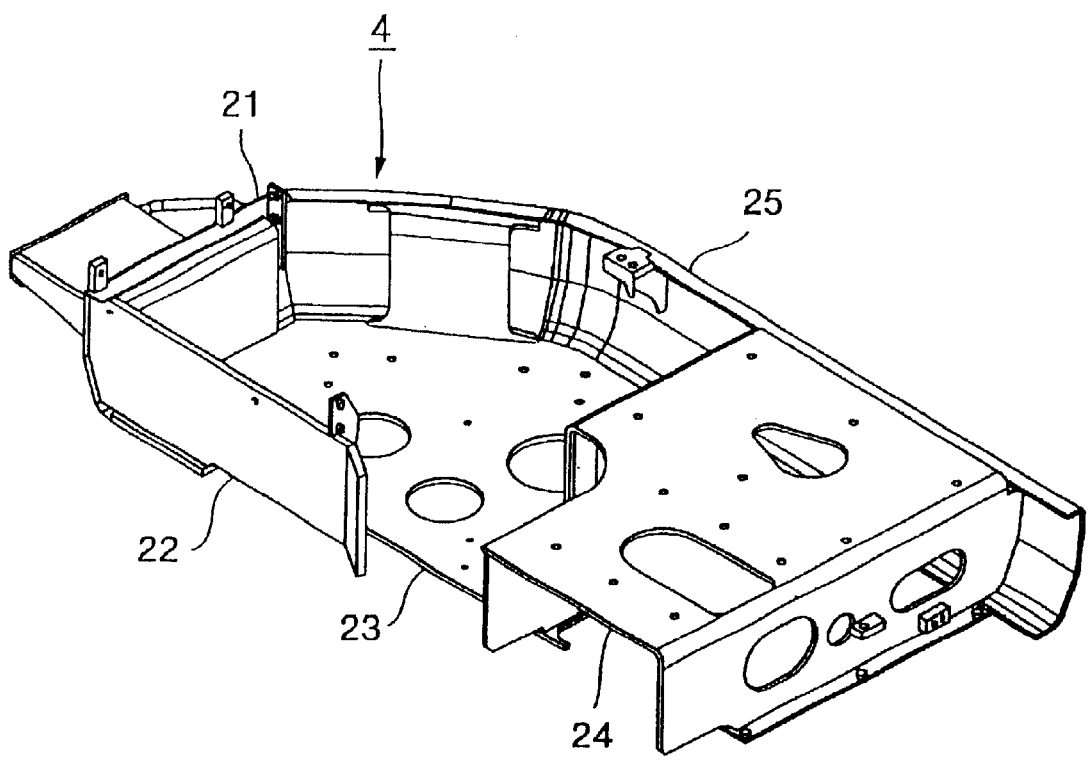
FIG. 4 is a perspective view of a right-hand side deck of the same.
Figure 5:
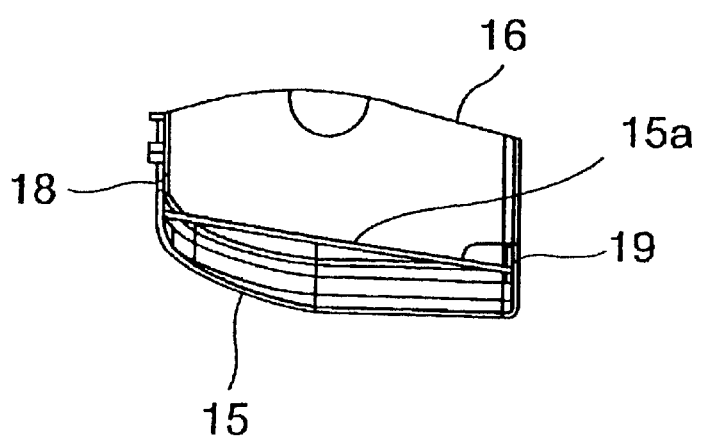
FIG. 5 is a section taken along line A—A of FIG. 2 of the same.

The left and right side decks 3 and 4 will be described with reference to FIGS. 3 to 5. FIGS. 3 and 4 are perspective views of the left and right side decks, respectively, and FIG. 5 is a sectional view taken along line A—A of FIG. 2.

As shown in FIG. 3, the left side deck 3 is constructed: by jointing a front portion 3a, as made by jointing a front frame 11, a side plate 12, an under plate 13, an upper plate 14 and so on, and a rear portion 3b, as made by jointing overhanging beams 16 and 17, an under plate 18 and so on, with an upper plate 19; and by jointing those front portion 3a and rear portion 3b and the left end portion of the upper plate 19 with a side frame 15. The overhanging beams 16 and 17 are fixed to overhang to the left from the center plate 5, as shown in FIG. 1, and the under plate 18 is fixed between the two lower faces of the overhanging beams 16 and 17. The side plate 12 is fixed facing forward, on the front portion of the left side of the center plate 5, and the front frame 11 is so fixed on the front portion of the side plate 12 as to overhang to the left side. To the individual leading edge portions of the front frame 11 and the overhanging beams 16 and 17, further, there is fixed the side frame 15 with a plate 15a interposed, as shown in FIG. 5. Moreover, the under plate 13 and the upper plate 14 are fixed to the lower faces and upper faces of the front frame 11, the side frame 12 and the side frame 15, respectively, and the upper plate 19 is fixed to the upper faces of the upper plate 14, the side frame 15 and the overhanging beam 16.

The right side deck 4 is constructed, as shown in FIG. 4, by jointing a front frame 21, a side plate 22, an under plate 23, an overhanging beam 24 and so on and further by jointing their right leading ends to a side frame 25. In short, as shown in FIG. 1, the side plate 22 is fixed facing forward to the front portion of the right side of the center plate 5, and the front frame 21 is so fixed to the front portion of the side plate 22 as to overhang to the right side. On the other hand, the overhanging beam 24 is so fixed on the generally longitudinal center portion of the center plate 5 as to overhang to the right side, and the side frame 25 is fixed between the right leading end portions of the front frame 21 and the overhanging beam 24. Moreover, the under plate 23 is fixed to the individual lower faces of the side plate 22, the front frame 21, the side frame 25 and the overhanging beam 24.

Figure 6:
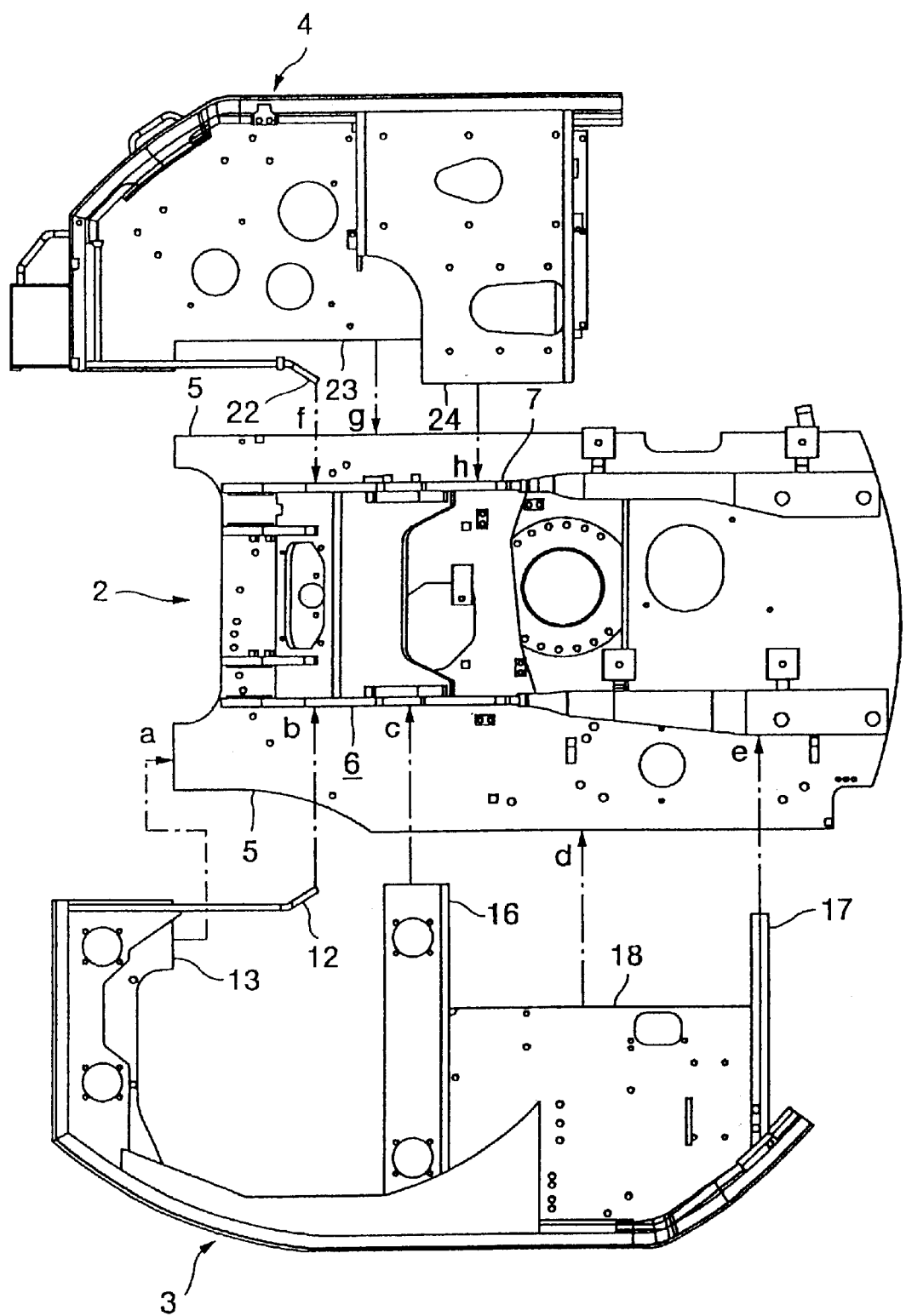
FIG. 6 is a block diagram of the revolving deck of the same.

The construction of the revolving deck 1 will be described with reference to FIG. 6. FIG. 6 is a block diagram of the revolving deck 1. The left side deck 3 is integrated on the left side of the main frame 2, as shown in FIG. 6, with the main frame 2 by jointing the under plate 13 to a portion a of the center plate 5, the side plate 12 to the left center beam 6 and portion b of the center plate 5, the overhanging beams 16 and 17 to the left center beam 6 and portions c and e of the center plate 5, and the under plate 18 to portion d of the center plate 5, respectively.

Likewise, the right side deck 4 is integrated on the right side of the main frame 2, as shown in FIG. 6, with the main frame 2 by jointing the side plate 22 to the right center beam 7 and portion f of the center plate 5, the under plate 23 to portion g of the center plate 5, and the overhanging beam 24 to the right center beam 7 and portion h of the center plate 5, respectively.

Figure 7:
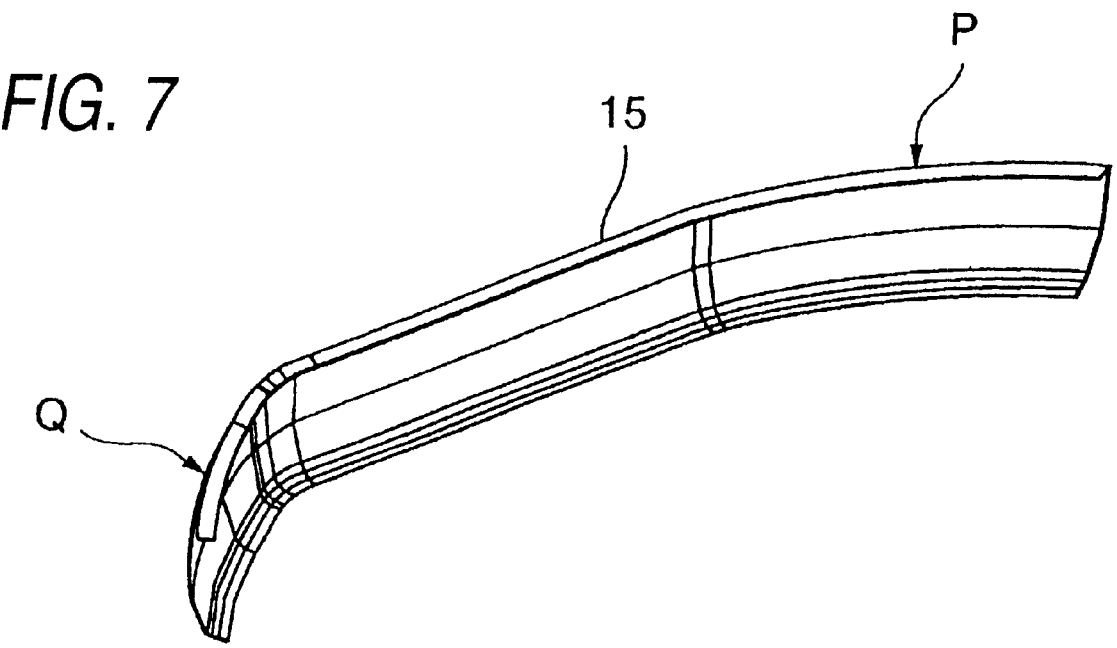
FIG. 7 is a perspective view of a left-hand side frame of the same.
Figure 8:
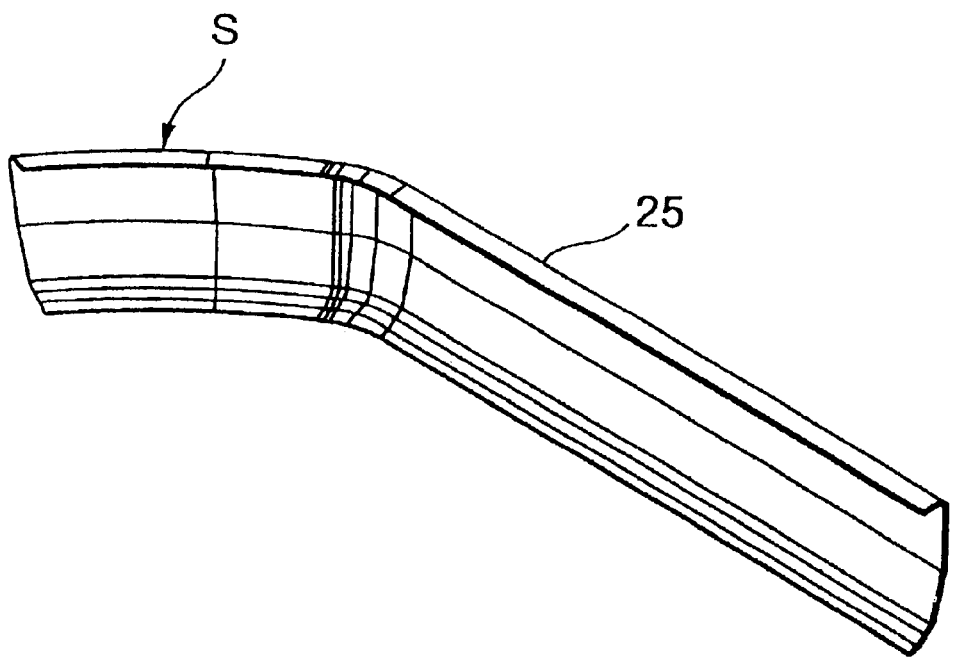
FIG. 8 is a perspective view of a right-hand side frame of the same.

The left and right side frames 15 and 25 will be described with reference to FIGS. 7 and 8. FIGS. 7 and 8 are perspective views of the inner faces of the left and right side frames 15 and 25, respectively.

As shown in FIGS. 7 and 8, the left and right side frames 15 and 25 are bent to have generally C-shapes. Moreover, portions P and Q of the left side frame 15 and portion S of the right side frame 25 are so bent that the left and right side decks 3 and 4 are confined, being jointed to the main frame 2, within a tail swing radius R substantially equal to the swinging locus drawn by the rear end portion of the counter weight 36, as shown in FIG. 2.

According to the invention thus far described, the revolving deck 1 is formed to have its outermost end confined during the swinging motion within the tail swing radius R substantially equal to the swinging locus of the rear end portion of the counter weight 36, so that it is kept away from contact with obstacles while it is being revolved.

On the other hand, the revolving deck 1 is given an integral skeleton structure by jointing the main frame 2 and the left and right side frames 15 and 25, respectively, by the overhanging beams 16 and 17 and the overhanging beam 24. As a result, the revolving deck 1 can be made lighter than that made of a single-plate structure or a cast structure to lessen the required engine output power. Further, even the medium- or large-sized hydraulic excavator can be easily manufactured with a simple structure to lower the cost. Because of the integral skeleton structure, moreover, many openings can be formed in the lower face of the revolving deck 1 to make easier maintenance from the bottom of the implement.

Further, the left and right side frames 15 and 25 are fixed on the outer end portions of the overhanging beams 16, 17 and 24 so that they also perform the functions of revolving frame guards for guarding the lower outer peripheries of the revolving deck 1 against external obstacles. Therefore, no revolving frame guard is additionally required, which reduces the weight and the number of parts so that the parts can be easily serviced and the cost can be lowered.

Other examples of left side frames 15A and 15B having different shapes will be described with reference to FIGS. 9 to 11. Here will be omitted the description of right side frames 25A and 25B because they are similar to the left side frames 15A and 15B.

Figure 9:
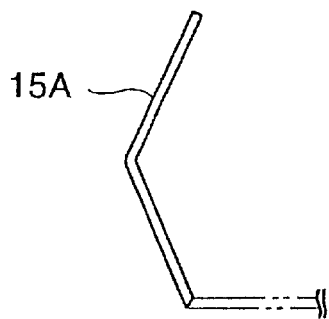
FIG. 9 is a diagram showing a side frame of another sectional shape of the same.
Figure 10:
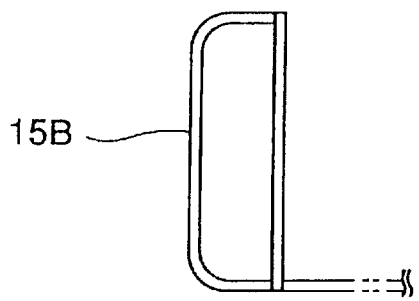
FIG. 10 is a diagram showing a side frame of still another sectional shape of a second example of the same.

The left side frame 15A shown in FIG. 9 is formed generally into a V-cross sectional shape and is attached to bulge outward from the revolving deck 1. On the other hand, the left side frame 15B shown in FIG. 10 is formed into a cross sectional D-shape composed of a straight portion and curved portions and is attached to have the curved portions directed outward from the revolving deck 1. FIG. 11 is a diagram illustrating an external force and a pebble acting on the side frame 15A.

Figure 11:
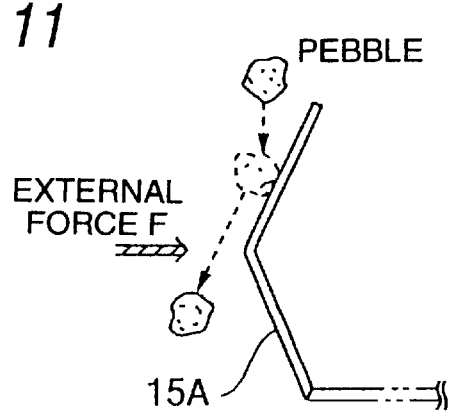
FIG. 11 is a diagram for explaining an external force and a pebble to act on the side frame of the same.

Generally, if the revolving deck 1 is revolving when hitting an obstacle while the hydraulic excavator 20 is operating, the external force F acts substantially horizontally on the outermost end of the side frame 15A, as shown in FIG. 11. Against this external force F, a higher resistance is exhibited by the frame portion of the side frame 15A or 15B meeting the force obliquely, due to the folded or D-Shape cross section, than that exhibited by another shape, so that the side frame 15A or 15B is hardly subject to any damage such as deformation or collapse.

On the other hand, the pebble, if having flown or fallen, will hit to slide down on the slope of the folded portion or the curved portion of the V- or D-Shape portion of the side frame 15A or 15B so that the side frame 15A or 15B is again scarcely damaged.

As a result, the side frame 15A or 15B having the V- or D-Shape section can exhibit a better function as the revolving frame guide.

According to the invention thus far described, there can be achieved the following effects.

The revolving deck has its outermost end swing radius R substantially equal to the swinging locus drawn by the counter weight, so that it is kept away from contact with obstacles while it is being revolved.

On the other hand, the revolving deck is given the integral skeleton structure which is made by jointing and fixing the main frame and the side frame by a plurality of overhanging beams, so that it can be made light in weight and low in cost. Moreover, it is possible to thereby make easier the maintenance from the bottom of the deck.

On the other hand, the side frames are welded over the plurality of overhanging beams to act as a revolving frame guard so that the revolving guard (or side frames) can provide a strength member for the entire revolving deck to reduce the number of parts and lower the cost.

By forming the sections of the side frames generally into a V-shape or a D-shape, moreover, the side frames can exhibit a high effectiveness as a revolving frame guard.

What is claimed is:

1. A revolving deck for earthmoving machinery, which comprises a separate main frame jointed to separate left and right side decks, the main frame including a revolving unit mounting portion with a rear end and a counter weight mounted on the rear end, the left and right side decks respectively arranged on left and right sides of the main frame, the left and right side decks being made of an integral skeleton structure including a plurality of overhanging beams joining the main frame and the side frames, the left and right side decks having a side frame respectively disposed at outer ends of the left and right side decks and fixed to the overhanging beams, the side frames being bent, and the left and right side decks are constructed so the revolving deck is confined within a swing radius R that is equal to a swinging radius drawn by an outward edge of the rear end of the main frame pivoting about a center located within the main frame.

2. The revolving deck for earthmoving machinery according to claim 1, wherein the side frames have a guard structure for protecting the overhanging beams and the main frame from an external force.

3. The revolving deck for earthmoving machinery according to claim 1, wherein the main frame further has left and right center beams and the revolving unit mounting portion is arranged between the left and right center beams, the overhanging beam of the right side deck joins a right side of the right center beam of the main frame, and the overhanging beam of the left side deck joins a left side of the left center beam of the main frame.

* * * * *